(12) United States Patent
Tandon et al.

(10) Patent No.: US 8,984,641 B2
(45) Date of Patent: Mar. 17, 2015

(54) FIELD DEVICE HAVING TAMPER ATTEMPT REPORTING

(71) Applicant: Honeywell International Inc., Morristown, NJ (US)

(72) Inventors: Vibhor Tandon, Karnataka (IN); Joseph Pane, North Wales, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/648,848

(22) Filed: Oct. 10, 2012

(65) Prior Publication Data

US 2014/0101771 A1    Apr. 10, 2014

(51) Int. Cl.
*G06F 11/00* (2006.01)
*G06F 21/00* (2013.01)
*G06F 21/55* (2013.01)

(52) U.S. Cl.
CPC .............. *G06F 21/00* (2013.01); *G06F 21/554* (2013.01)
USPC ................... 726/25; 726/22; 726/23; 726/24; 702/188

(58) Field of Classification Search
None
See application file for complete search history.

(56) References Cited

U.S. PATENT DOCUMENTS

| | | | |
|---|---|---|---|
| 5,764,891 A * | 6/1998 | Warrior ........................... | 710/72 |
| 6,990,434 B2 * | 1/2006 | Minogue et al. .............. | 702/188 |
| 7,263,459 B2 * | 8/2007 | Ito et al. ........................ | 702/138 |
| 7,584,165 B2 | 9/2009 | Buchan | |
| 8,074,278 B2 * | 12/2011 | Law et al. ....................... | 726/23 |
| 8,255,692 B2 | 8/2012 | Holm-Hansen et al. | |
| 2003/0154056 A1 * | 8/2003 | Ito et al. ........................ | 702/188 |
| 2004/0249846 A1 * | 12/2004 | Randall et al. ................ | 707/102 |
| 2006/0052985 A1 * | 3/2006 | Ito et al. ........................ | 702/188 |
| 2006/0176167 A1 * | 8/2006 | Dohrmann ..................... | 340/506 |
| 2006/0241913 A1 * | 10/2006 | De Groot et al. ............. | 702/188 |
| 2007/0094716 A1 | 4/2007 | Farino et al. | |
| 2008/0184023 A1 * | 7/2008 | Shih ................................ | 713/2 |
| 2008/0235473 A1 | 9/2008 | Hofmann et al. | |
| 2009/0065578 A1 | 3/2009 | Peterson et al. | |
| 2009/0106563 A1 * | 4/2009 | Cherpantier ................... | 713/194 |
| 2012/0144489 A1 * | 6/2012 | Jarrett et al. .................... | 726/24 |
| 2012/0310373 A1 * | 12/2012 | Karaffa et al. ................. | 700/11 |

FOREIGN PATENT DOCUMENTS

KR        100880211        1/2009

* cited by examiner

*Primary Examiner* — Aravind Moorthy
*Assistant Examiner* — Jason Plotkin
(74) *Attorney, Agent, or Firm* — Jetter & Associates, P.A.

(57) ABSTRACT

A method of tamper attempt reporting includes receiving a write attempt to configuration data stored within a field device in an industrial plant configured to run a process involving a plurality of physical process parameters including a network server, a plurality of processing units, and a plurality of field devices. The plurality of field devices include (i) a sensor for measuring at least one of the plurality of physical process parameters or (ii) an instrument for performing control output actions for at least one of the plurality of processing units. The plurality of field devices are in communication with at least one remote host system or device. The write attempt is automatically detected. An alert of the write attempt is automatically sent to at least the remote host system or device.

15 Claims, 4 Drawing Sheets

| Write Protection | Write Protection | Tamper Reporting | Tamper Alarm on Write | Write Cmd Status |
|---|---|---|---|---|
| SWP OR Jumper | ON | ON | Yes | Failure |
| SWP AND Jumper | OFF | ON | Yes | Success |
| SWP OR Jumper | ON | OFF | No | Failure |
| SWP AND Jumper | OFF | OFF | No | Success |
| Jumper Moved | NA | ON | Yes | NA |
| Jumper Moved | NA | OFF | No | NA |

*FIG. 4*

FIELD DEVICE HAVING TAMPER ATTEMPT REPORTING

FIELD

Disclosed embodiments relate to devices having tamper attempt detection and reporting.

BACKGROUND

In industrial process control, sensors for sensing physical measurements for the process being run (e.g., pressure, temperature, level, or fluid flow) and instruments for performing control output actions (e.g., control valves, actuators, or drive units) for the processing units in industrial plants may be located across a large geographic area. These instruments are generally referred to as "field devices" or "field instruments" (hereafter "field devices"), which may be located in areas that are either manned or unmanned. The levels of security at the various locations may vary. All of these factors present a challenge to assure the field devices remain operating as intended, and as verified during the commissioning process before they are placed in service.

Contemporary field devices are generally termed "smart" field devices because they provide valuable asset data besides the basic sensor or control function for a physical parameter. This asset data relates to the diagnostic health of the field device and the process/application with which it is involved. In the case of a smart position sensor, for example, an ability to self-calibrate is provided by a combination of an Application-Specific Integrated Circuit (ASIC) and an array of magneto-resistive (MR) sensors to accurately and reliably determine the position of a magnet attached to a moving object (e.g., elevator, valve, machinery, etc.), so that the object's position can be accurately determined.

Field devices generally use standard field communication protocols such as HART, WirelessHART, FOUNDATION FIELDBUS, PROFIBUS, PROFINET or ISA 100.11a, to communicate with a remote host system or device, such as a network server, distributed control system (DCS), safety system, instrument asset management system, or handheld configurator. Such host systems or devices generally include write access to the smart devices, and often the smart device itself supports configuration through its own local interfaces, such as a local display screen and switches. The configuration parameters are set for each field device by the user with any of the aforementioned hosts available so that the field device operates as intended.

Since field devices may perform mission critical measurement and control, the data security in such devices is important. Accordingly, any changes to the configuration data of the device (values held in different process parameters) need to be safely guarded, and care is generally taken to prevent unintended configuration changes to be made after commissioning. Configuration changes, whether changed inadvertently or changed maliciously, may be detrimental to the operation of the plant, and in certain cases might put human life at risk.

Traditionally, unauthorized changes to configuration data is avoided by plants having Standard Operating Procedures (SOPs) for field device access for writes/configurations, and sometime access for reads as well, where the host systems or devices provide write access control to specific users/specific scenarios, and then the field devices themselves perform write protection. The write protection for field devices is generally implemented by software or by hardware (a write protect hardware jumper), or by both.

When a field device is configured for write protection, the intent is to block unauthorized changes to its configuration data. Write protection methods are standard, and generally perform their function effectively. However, the systems and individuals responsible for the safe plant operations of the process and those responsible for the proper operations of the field devices are not made aware of attempts to change device configurations.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize although conventional write protect mechanisms provide protection from tampering activities changing configuration data (sometimes referred to as configuration parameters) for field devices within an industrial plant, there is no tamper attempt reporting provided, which can be of value for certain purposes including audit and prompt identification of hackers or other unauthorized individuals. Disclosed embodiments include software referred to herein as "Automatic Tamper Attempt Reporting" (ATAR) algorithms for the tracking and reporting of attempts to change field device configuration data when the field device is configured for write protection. Disclosed embodiments can inform operations and maintenance systems and personnel to attempted configuration data changes which are against Standard Operating Procedures (SOPs) and malicious attempts to disrupt plant operations (e.g., by hackers or disgruntled employees or contractors).

One disclosed embodiment comprises a method of tamper attempt reporting for field devices at an industrial plant. A write attempt is received to configuration data stored by a field device in an industrial plant configured to run a process involving a plurality of physical process parameters including a network server, a plurality of processing units, and a plurality of field devices. The industrial plant generally includes other network infrastructure, such as wireless infrastructure. The plurality of field devices include (i) a sensor for measuring at least one of the plurality of physical process parameters or (ii) an instrument for performing control output actions for at least one of the processing units. The software write attempt or movement of a write protect hardware jumper (if the field device includes a write protect hardware jumper) is automatically detected, and an alert of the write attempt is automatically sent to at least one remote host system or device that the field device is in communication with, such as the network server in one particular embodiment.

As used herein, a remote host system or device is any system or device the field device is in communication with which has the ability to read and/or write to configuration data in the field device, irrespective of the distance to the field device. For example, the remote host system or device can comprise a distributed control system (DCS), a safety system, instrument asset management system, or handheld configurator. Additionally, the remote host system or device can comprise a tablet device, a cell phone/smart phone, or a supervisory control and a data acquisition (SCADA) system.

BRIEF DESCRIPTION OF THE DRAWINGS

FIG. 4 is a table showing example tamper alert rules for an example ATAR algorithm where the field device includes a write protect hardware jumper.

DETAILED DESCRIPTION

Figure 1:
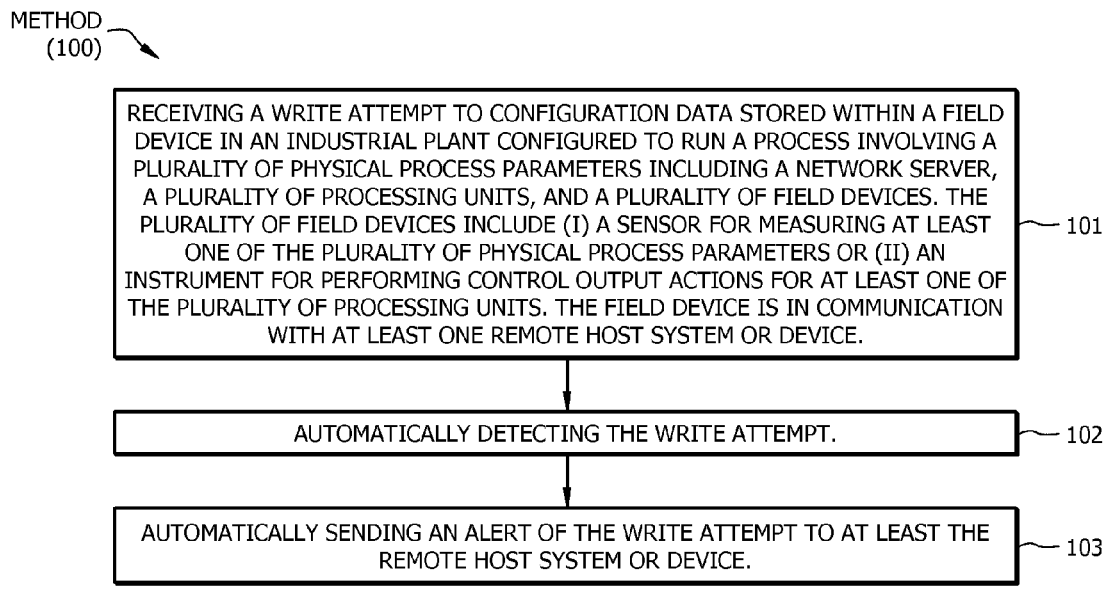
FIG. 1 is a flow chart that shows steps in a method of tamper attempt reporting for field devices at an industrial plant, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include ATAR algorithms for field devices having write protect mechanism(s) for configuration data that allow implementation of tamper attempt tracking which permits individuals responsible for plant operations or instrument maintenance to be alerted to attempted changes to the configuration data of a field device. While it may appear that no harm has been caused in the cases where the write protect mechanism successfully blocks attempts to change configuration data, disclosed embodiments recognize unauthorized activity such as hacker behavior may try to gain access to a number of field devices, appliances, or systems one at a time until they find one that is unprotected. Using the detection and reporting mechanism described herein provides an early warning system of unauthorized write attempts to configuration data detected across the broad distribution of field devices.

The ATAR algorithm can generally be switched on/off to be enabled or disabled, including by a user of the field device itself using a user interface. Once enabled, the ATAR algorithm automatically tracks attempts to change configuration data of field device, and can automatically alert a remote host system or device using standard alarm/events/diagnostic reporting as specified by the underlying communication protocol utilized and its standards, such as based on HART, WirelessHART FOUNDATION FIELDBUS, PROFIBUS, PROFINET, or ISA 100.11a communication protocols.

FIG. 1 is a flow chart that shows steps in a method 100 of tamper attempt reporting for field devices at an industrial plant, according to an example embodiment. The field device is provided with a disclosed ATAR algorithm, which can include a user selectable (on/off) switch that can work in addition to write protect software and/or a write protect hardware jumper (if provided by the field device). When the ATAR algorithm is enabled, write attempts to the field device or movement of the write protect hardware jumper (if provided by the field device) can result in the field device automatically reporting a tamper alert, such as through standard communication mechanisms within the associated communication protocol to a remote host system or device.

Step 101 comprises receiving a write attempt to configuration data stored by a field device operable for controlling one of a plurality of physical process parameters involved in a process run by the industrial plant. The field devices include (i) a sensor for measuring at least one of the plurality of physical process parameters (e.g., pressure, temperature of flow) or (ii) an instrument for performing control output actions for at least one of the plurality of processing units. The industrial plant includes a network server, a plurality of processing units. The field device is in communication with at least one remote host system or device. A disclosed ATAR algorithm is generally stored in a memory of the field device having executable code for automatically detecting the write attempt (step 102 described below) and automatically sending the alert (step 103 described below).

Step 102 comprises automatically detecting the write attempt received in step 101. The write attempt detected can be due to an attempt to change a configuration parameter(s) protected by write protect software and/or or physical movement of a write protect hardware jumper if field device has a write protect hardware jumper. The write protect hardware jumper typically closes a circuit when it is in place, and opens the circuit when it is removed. Logic in the field device (e.g., provided by a microprocessor) detects when the associated write protect circuit is either open or closed, and detects changes of state from either off to on, or on to off.

Step 103 comprises automatically sending an alert of the write attempt to at least the remote host system or device. Reporting can be via the communication media used by the industrial plant, including wireless media or wired media. The tamper alert can also be sent to auxiliary units in the vicinity of the field device sending the alert, such as handhelds (e.g., handheld configurators) and mobile stations, or auxiliary units including remote display meters.

Responsible personnel (e.g., individuals in the control room with the network server) can thus be alerted to write attempts. If the action reported by the field device was authorized by work order and SOP, the alert can be simply acknowledged by the remote host system or device user. If the write attempt reported by the field device was not authorized by work order and SOP, follow-up action can follow. Follow-up actions can include sending someone to location, such as a field technician or security guard, monitoring the area with video cameras, or tracking the alerts to see if there is a pattern of which field devices are reporting possible tampering.

In some embodiments, the field devices include a write protect hardware jumper. In this embodiment the write attempt includes both attempts to bypass write protection software protecting the configuration data as well as movement of the write protect hardware jumper. The method can further comprise incrementing a counter for each write attempt, and delaying the automatic sending of the alert until the counter reaches a predetermined number >1, wherein the predetermined number can be programmable (e.g., user programmable). A "number of allowed attempts" can be a user configurable number which can be compared against a counter of write attempts once the ATAR algorithm is enabled. If the counter crosses this number, a tamper attempt alert can be automatically issued by the field device.

The alert can persist for a predetermined time (a "tamper alarm latency"), wherein the predetermined time can be programmable (e.g., user programmable). For example, a user configurable predetermined time between 1 to 60 seconds (both inclusive), can specify the tamper alarm latency.

The method can include enabling and disabling of the ATAR algorithm, including user enabling or disabling through a switch or through a user interface. In this embodiment, disabling (changing from on to off) of the ATAR algorithm can result in automatically sending the alert.

In one embodiment, once the ATAR algorithm is enabled, and subsequent to the enabling of the counter for write attempts crossing the "Number of Allowed Attempts", the field device automatically issues a tamper alert by setting an appropriate bit in one of its response bytes. In one particular embodiment utilizing the HART communications protocol, responsive to a command number 48 (read_additional_device_status, "Cmd 48") message from a host system or device, the field device issues a tamper alert by setting a bit (that is recognized as a tamper alert bit) in the response bytes sent to the remote host system or device. The tamper alert may be acknowledged by the remote host system or device by reading the response bytes from the field device. Once the host system or device has acknowledged the tamper alert, the field device can clear the bit set for the alert after the predetermined time configured (the tamper alarm latency).

Disclosed ATAR algorithms can also include code for generating an alert to at least the host system or device following an attempt to disable the ATAR algorithm. For example, an attempt to disable the ATAR algorithm can be sensed by removal of the write protect hardware jumper while ATAR is enabled (see row 5 of FIG. 4 described below).

Disclosed ATAR algorithms can also analyze the data of tamper alerts on the system, to enable the alerts to report details of the specific configuration data parameter(s) which were attempted to be changed. The ATAR algorithm can save the parameter ID that was attempted to be changed and can also save the value that was attempted to be written. Tampering detection and an alert can be automatically sent if the housing of the field device is opened. A suitable sensor can be used to detect opening of the housing. An audio/visual indication (audible alarm or blinking light) at the field device itself can also be provided for indicating a tamper alert. Configurability options can be provided to the user for setting thresholds for number of allowed attempts and tamper alarm latency, etc. Configurability options also can include which video feed relates to tampering alert on a specific device in a scenario where the location is video monitored with multiple cameras. The field device can also self-audit the write attempts. Once the field device self-audits the tamper attempts, standard communication mechanisms between the field device and host system or device can be used to retrieve the audit records.

Figure 2A:
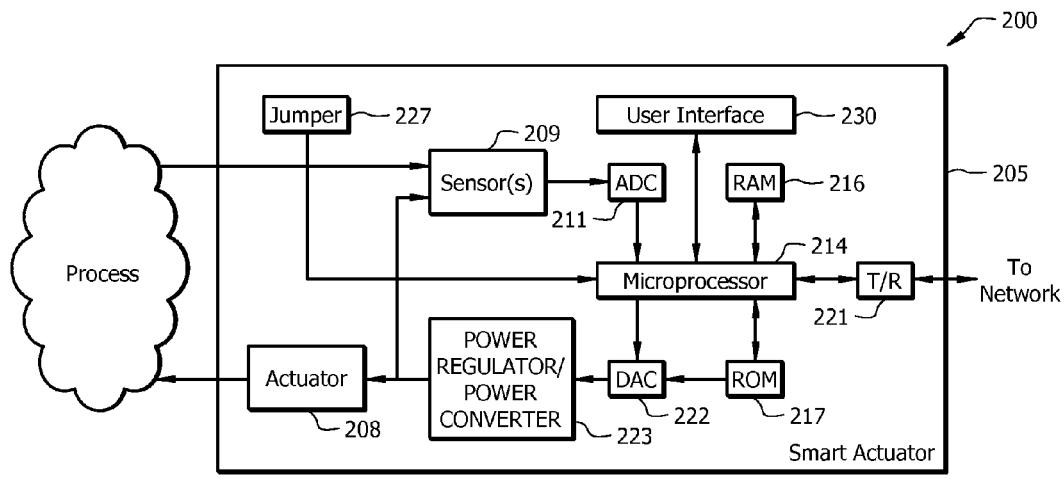
FIG. 2A is a block diagram depiction of an example smart instrument for performing control output actions for processing units shown as a smart actuator having disclosed tamper attempt reporting.
Figure 2B:
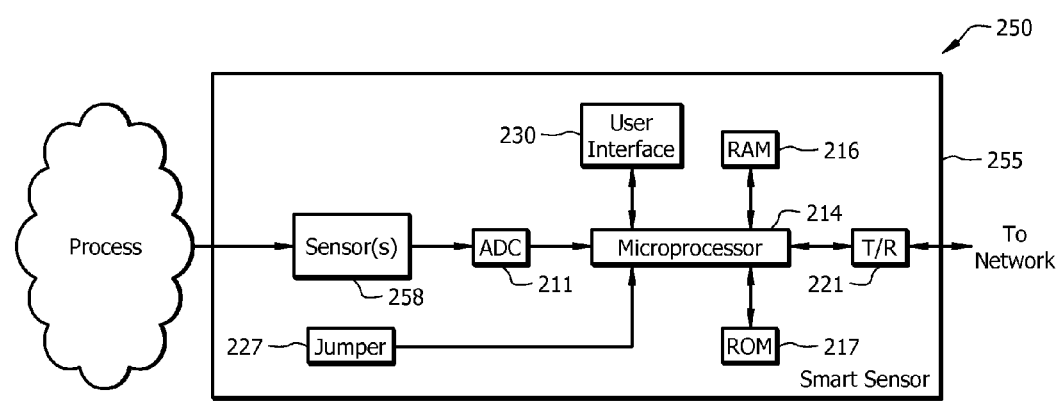
FIG. 2B is a block diagram depiction of an example a smart sensor having disclosed tamper attempt reporting, according to example embodiments.

FIG. 2A is a block diagram depiction of an example smart actuator 200 having disclosed tamper attempt reporting, and FIG. 2B is a block diagram depiction of a smart sensor 250 having disclosed tamper attempt reporting, according example embodiments. Smart actuator 200 includes a housing 205. Smart actuator 200 is shown including an actuator 208 and a sensor 209 coupled to processing units involved in the process, and an analog to digital converter (ADC) 211. The output of the ADC 211 is coupled to a processor or other computing device shown as a microprocessor 214. Microprocessor 214 includes static random access memory (SRAM shown as RAM) 216 and read only memory (ROM) 217 for memory. The ATAR algorithm is generally stored in RAM 216 when RAM 216 comprises a SRAM. Microprocessor 214 is coupled to transmit and receive (T/R) circuitry 221 including a transceiver and optional bus controller which provides communications to and from the network utilized by the industrial plant.

The output of the microprocessor 214 is coupled to a digital to analog (DAC) converter 222. DAC 222 is coupled to power regulator/power converter 223 which is coupled to an input of the actuator 208. Smart actuator 200 includes a user interface 230 that allows user' entry of data, including parameters for the ATAR algorithm, including a threshold for the number of allowed write attempts and tamper alarm latency. Smart actuator 200 also includes a write protect hardware jumper shown as jumper 227, which is coupled to the microprocessor 214.

The smart sensor 250 in FIG. 2B includes a housing 255. Smart sensor 250 is shown including a sensor 258 and an ADC 211. The output of the ADC 211 is coupled to a processor or computing device shown as a microprocessor 214. Microprocessor 214 includes RAM 216 and ROM 217 for memory. The ATAR is generally stored in RAM 216 when RAM 216 comprises a SRAM. Microprocessor 214 is coupled to T/R circuitry 221 which provides communications to and from a network utilized by the industrial plant. Smart sensor 250 includes a user interface 230 that allows user entry of data, including parameters for the ATAR algorithm. Smart sensor 250 also includes a write protect hardware jumper 227 which is coupled to the microprocessor 214.

Figure 3:
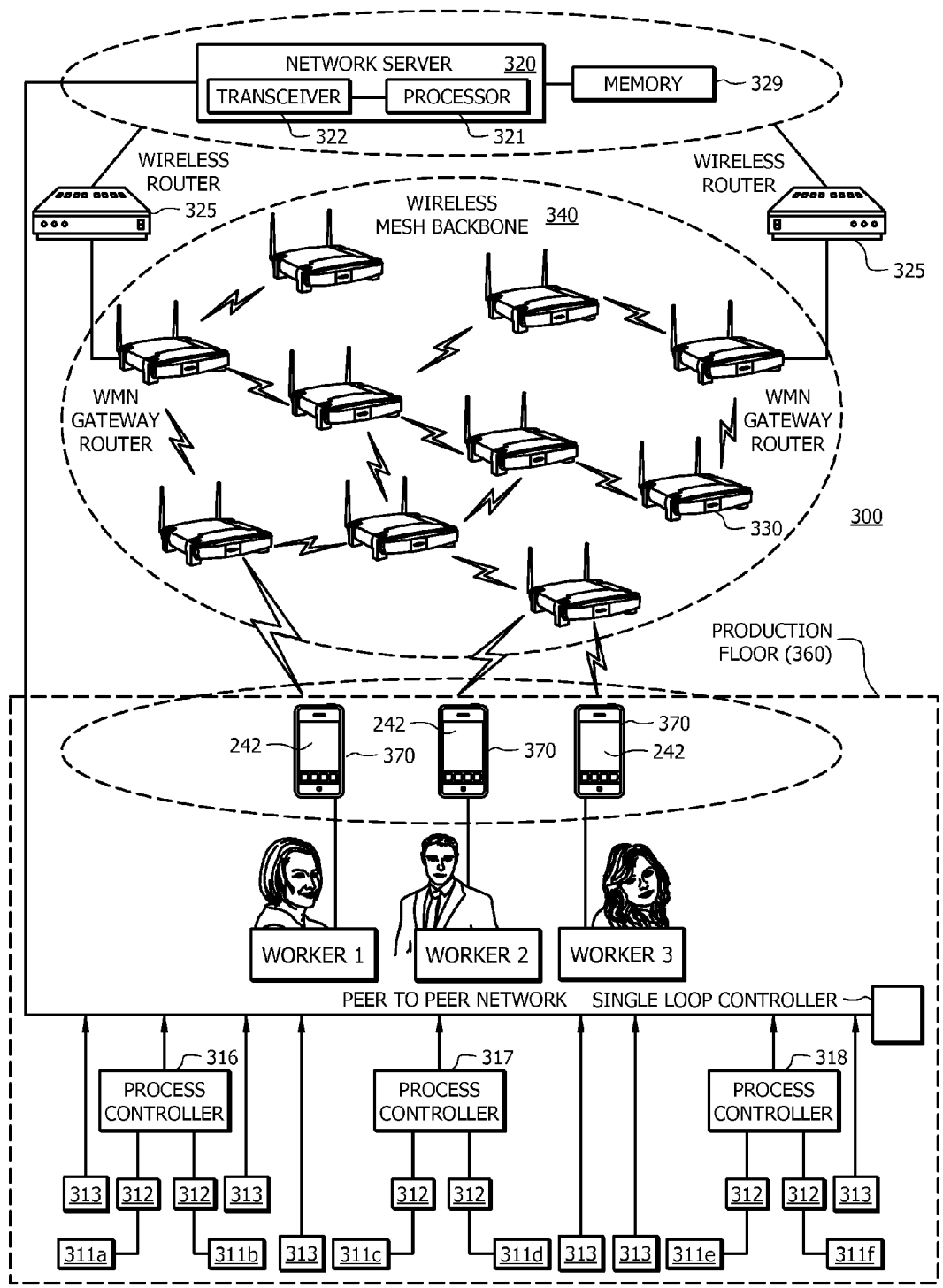
FIG. 3 is a block diagram of an industrial plant comprising processing units, along with a wireless communications network including a network server, at least one router, a plurality of operators, and a plurality of field devices having disclosed tamper attempt reporting, according to an example embodiment.

FIG. 3 is a block diagram of an industrial plant 300 comprising a production floor 360 including processing units 311a-f, and field devices having disclosed ATAR algorithms. The field devices are shown as instruments (e.g., actuators) 312 for performing control output actions for at least one of the plurality of processing units 311a-f, and sensors 313 coupled to the processing units 311a-f for measuring at least one physical process parameter. In one embodiment instruments 312 can comprise smart devices analogous to the smart actuator 200 shown in FIG. 2A, and sensors 313 can comprise smart sensors analogous to the smart sensor 250 shown in FIG. 2B.

The industrial plant 300 includes a wireless communications network including a network server 320, at least one router shown as wireless routers 325 and gateway routers 330 arranged in a wireless mesh backbone 340. A plurality of operators/workers shown as workers 1, 2 and 3 each having a handheld computing device 370 are on the production floor 360. The handheld computing devices 370 include a wireless transceiver, a processor, and a memory, with their display screen 242 shown. The network server 320 includes a processor 321 and a wireless transceiver 322 for wirelessly transmitting information to the handheld computing devices 370 and field devices 312, 313. Network server 320 is also coupled to a memory 329 that can store information including configuration data for the field devices and data for a data historian.

Industrial plant 300 is shown configured as a DCS where the process controllers 316-318 are not central in location, but are distributed throughout the industrial plant 300 with each component sub-system controlled by one or more controllers. Industrial plant 300 can implement activities such as oil refining, petrochemicals, central station power generation, fertilizers, pharmaceuticals, food and beverage manufacturing, cement production, steelmaking, papermaking, and gas processing.

FIG. 4 is a table 400 showing example tamper alert rules for an example ATAR algorithm when the field device includes a write protect hardware jumper. SWP refers to software write protection, and the jumper refers to a write protect hardware jumper. The field device is provided a parameter shown as "tamper reporting" (On/Off) in addition to write protect and the write protect hardware jumper. The ATAR algorithm allows the field device to report attempts to configuration changes when write protection mechanisms (soft/hard) are enabled. As noted above, the ATAR algorithm itself can generate an alert when it is changed from on to off.

EXAMPLES

Disclosed embodiments are further illustrated by the following specific Examples, which should not be construed as limiting the scope or content of this Disclosure in any way.

An example ATAR algorithm was implemented in a Honeywell ST 800™ Smartline Pressure device's HART version. The device implemented a parameter called "Tamper Reporting" which had states of "Enable" and "Disable". The field device further implemented parameters including "Number of Allowed Attempts", which was a user configurable number which was compared against a counter of write attempts once the ATAR algorithm was enabled. When the counter crossed this predetermined number, a tamper attempt alert was issued automatically by the field device.

"Tamper Alarm Latency" was a user configurable value between 1 to 60 seconds (both inclusive), which specifies the time up to which the field device persists the tamper alarm. Therefore, once the tamper reporting was "enabled", and subsequently the counter for write attempts crosses the "number of allowed attempts", the field device issued a tamper alert. The tamper alert is provided by the field device by setting "More Status Available" (MSA) bit in the device status byte. Once the host (e.g., DCS/Asset Management system) observes the MSA bit (as part of regular polling/communication) it sends the HART Command 48 (read_additional_device_status). Once the field device receives the Command 48 request it replies with the response bytes where one of the appropriate bytes have the Tamper Alert bit set. After this transmission the device clears the Tamper Alert bit after expiration of the configured "Tamper Alarm Latency" period. Although some embodiments were implemented in HART protocol, disclosed ATAR algorithms can be implemented in WirelessHART, Foundation Fieldbus, PROFIBUS, PROFINET, ISA 100.11a, or any other communication protocol. Only the delivery method of the data using messaging infrastructure available in any specific communication protocol is different.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention claimed is:

1. A method of tamper attempt reporting, comprising:
receiving a write attempt to configuration data stored within a field device in an industrial plant configured to run a process involving a plurality of physical process parameters including a network server, a plurality of processing units, and a plurality of said field devices, said plurality of field devices including (i) a sensor for measuring at least one of said plurality of physical process parameters or (ii) an instrument for performing control output actions for at least one of said plurality of processing units, said plurality of field devices each being in communication with at least one remote host system or device;

said field device automatically detecting said write attempt, and said field device automatically sending an alert of said write attempt to at least said remote host system or device;

wherein said plurality of field devices further include a memory, wherein an Automatic Tamper Attempt Reporting (ATAR) algorithm is stored in said memory, said ATAR algorithm having executable code for said automatically detecting said write attempt and said automatically sending said alert, and wherein disabling of said ATAR algorithm results in automatically sending an alert to said remote host system or device.

2. The method of claim 1, wherein said remote host system or device includes said network server.

3. The method of claim 1, wherein said plurality of field devices further include a write protect hardware jumper, and wherein said write attempt includes both attempts to bypass write protection software protecting said configuration data and movement of said write protect hardware jumper.

4. The method of claim 1, further comprising incrementing a counter for each said write attempt, and delaying said automatically sending said alert until said counter reaches a predetermined number >1, wherein said predetermined number is at least one of programmable and user configurable.

5. The method of claim 1, wherein said automatically sending said alert persists for a predetermined time, and wherein said predetermined time is at least one of programmable and user configurable.

6. The method of claim 1, wherein a local alert of said write attempt is indicated on said plurality of field devices by at least one of an audio signal and a visual signal.

7. A field device, comprising:
(i) a sensor for measuring at least one of a plurality of physical process parameters associated with a process involving said plurality of physical process parameters run by an industrial plant having a plurality of processing units configured to run said process, or (ii) an instrument for performing control output actions for said plurality of processing units, wherein said field device is in communication with at least one remote host system or device;
a memory for storing configuration data and an Automatic Tamper Attempt Reporting (ATAR) algorithm;
a processor operatively coupled to said sensor or said instrument, and to said memory to implement said ATAR;
a transceiver coupled to said processor for enabling communications over a network used by said industrial plant, and
wherein said ATAR algorithm has executable code for:
automatically detecting a write attempt to said configuration data, and
automatically sending an alert of said write attempt to at least said remote host system or device;
wherein disabling of said ATAR algorithm results in automatically sending an alert to said remote host system or device.

8. The field device of claim 7, wherein said field device includes a write protect hardware jumper, and wherein said write attempt includes both attempts to bypass write protection software protecting said configuration data and movement of said write protect hardware jumper.

9. The field device of claim 7, wherein said ATAR algorithm has executable code for incrementing a counter for each said write attempt, and delaying said automatically sending said alert until said counter reaches a predetermined number >1, wherein said predetermined number is at least one of programmable and user configurable.

10. The field device of claim 7, wherein said automatically sending said alert persists for a predetermined time, and wherein said predetermined time is at least one of programmable and user configurable.

11. The field device of claim 7, wherein said ATAR algorithm is programmable for enabling and disabling.

12. Machine readable storage for tamper attempt reporting at industrial plants, comprising:
a non-transitory machine readable storage media having code stored therein for implementing a tamper attempt tracking/reporting (ATAR) algorithm at a field device, said code including;
code for said field device automatically detecting a received write attempt to configuration data stored within a field device in an industrial plant configured to run a process involving a plurality of physical process parameters including a network server, a plurality of processing units, and a plurality of said field devices, said plurality of field devices including (i) a sensor for measuring at least one of said plurality of physical process parameters or (ii) an instrument for performing control output actions for at least one of said plurality of processing units, said plurality of field devices each being in communication with at least one remote host system or device;
code for said field device automatically sending an alert of said write attempt to at least said remote host system or device, and
code for automatically sending an alert to said remote host system or device when said ATAR algorithm is disabled.

13. The machine readable storage of claim 12, wherein said plurality of field devices include a write protect hardware jumper, and wherein said write attempt includes both attempts to bypass write protection software protecting said configuration data and movement of said write protect hardware jumper.

14. The machine readable storage of claim 11, further comprising code for incrementing a counter for each said write attempt, and delaying said automatically sending said alert until said counter reaches a predetermined number >1, wherein said predetermined number is at least one of programmable and user configurable.

15. The machine readable storage of claim 12, wherein said automatically sending said alert persists for a predetermined time, and wherein said predetermined time is at least one of programmable and user configurable.

\* \* \* \* \*